G. TAGLIABUE.
APPARATUS FOR ASCERTAINING THE PROOF SPIRITS IN FERMENTED MASH.
No. 111,885. Patented Feb. 14, 1871.
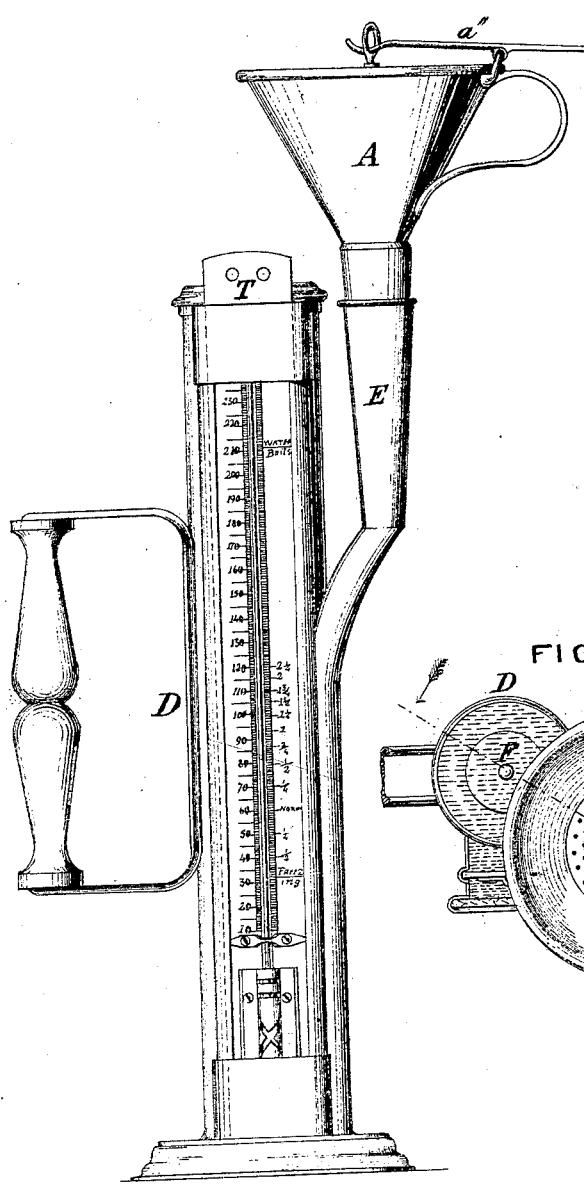
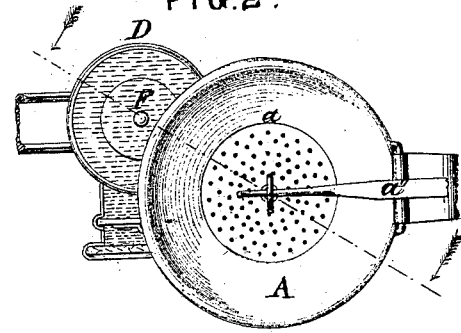
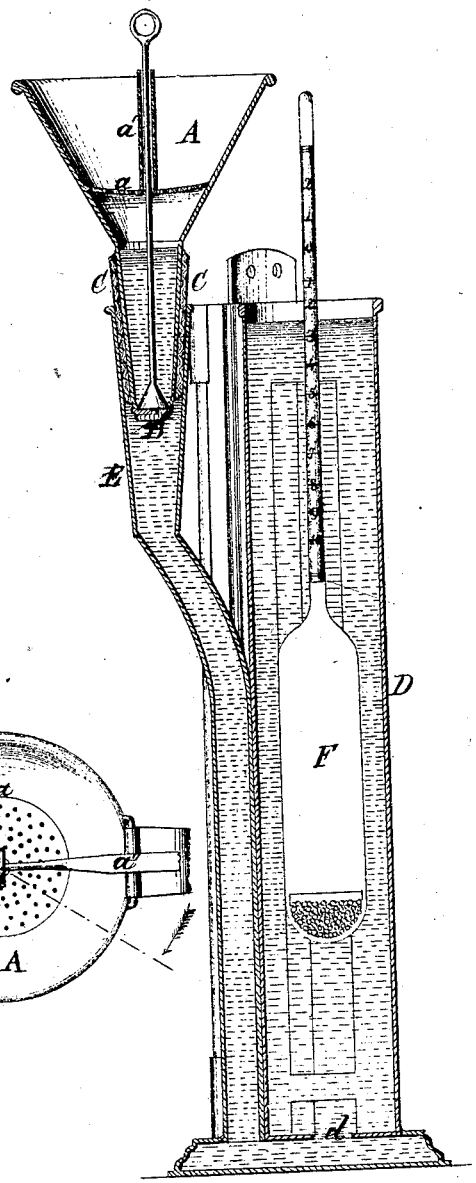

United States Patent Office.

GIUSEPPE TAGLIABUE, OF NEW YORK, N. Y.

Letters Patent No. 111,885, dated February 14, 1871.

IMPROVEMENT IN APPARATUS FOR ASCERTAINING THE PROOF-SPIRITS IN FERMENTED MASH.

The Schedule referred to in these Letters Patent and making part of the same.

I, GIUSEPPE TAGLIABUE, of the city, county, and State of New York, have invented a certain new and useful Process and Apparatus for Testing Liquors and for other purposes, of which the following is a specification.

Nature and Objects of the Invention.

My invention consists—

First, in constructing an areometer or hydrometer with a scale, which, when the instrument is applied to an unfermented grain-mash, will indicate directly the percentage of spirits which may be expected from the said mash provided the fermentation be carried to a proper point, and will admit of ready correction for excessive or defective fermentation without the necessity of complex calculation, or any reference to tables, as hereinafter explained.

Second, in a funnel of improved construction, for use in connection with the aforesaid can, and for various other purposes.

Description of the Accompanying Drawing.

Figure 1 is a front elevation of the can, showing a thermometer inserted in the body thereof, and the funnel, having its nozzle inserted in the filling-tube at the side.

Figure 2 is a top view of the apparatus complete, the can being partially concealed by the funnel.

Figure 3 is a vertical section on the line $x\,x$, fig. 2, showing the can filled with liquid and the areometer immersed therein.

In the several figures like letters of reference indicate corresponding parts.

General Description.

D is the can or reservoir, the front of which is made of glass, so as to allow a ready inspection of the thermometer T, without the necessity of removal.

It has a tube, E, at its side, somewhat enlarged or flaring at top for the reception of the funnel, and communicating at bottom, through the aperture $d$, with the body of the can, in which the areometer F is introduced for testing the density of the liquor.

The funnel A has a perforated plate or diaphragm, $a$, near its mid depth, and is provided with a plug or valve, B, attached to a rod passing through a tube, $a'$, rising from the center of the diaphragm, and raised or lowered by means of a lever, $a''$, pivoted at the rim of the funnel.

The diaphragm $a$ acts as a strainer, to prevent the admission of foreign substances into the can when the liquid is being poured therein through the funnel, and by means of the lever $a''$ the valve B may be so raised or lowered as to diminish or entirely cut off the passage of liquid, enabling the can to be filled to a proper height with great nicety without danger of overflow, and the liquid remaining in the funnel to be removed therewith without spilling.

The overflow is further prevented by the elastic packing C, around the neck of the funnel, accurately fitting the upper opening of the tube E.

This funnel is also designed to be used for filling bottles and other vessels, for which purpose the above-described arrangements render it well adapted.

The zero of the areometer F is taken at a point which indicates a specific gravity equal to that of water, and the graduations are arranged to indicate, not the percentage of saccharine matter contained in the liquid, nor the actual density of the liquid, as in the case of instruments heretofore used, but by a properly arranged scale to indicate directly, by a test of the unfermented mash, the percentage of proof-spirit which may be expected from the said mash, provided the fermentation be carried to a proper point which will reduce the density of the fermented beer to about that of water.

The scale of this instrument is based on the most approved experimental data, but it differs from all others of its class in indicating directly at the standard temperature, without calculation or table, the percentage of spirits to be expected from the mash.

The following table shows the specific gravities corresponding to points in the new scale, and also gives a comparison with Balling's saccharometer scale.

| Per cent. New scale. | Specific gravity. | Saccharometer scale. |
|---|---|---|
| 0° | 1.0000 | 0° |
| 5 | 1.0195 | 4.88 |
| 10 | 1.0387 | 9.58 |
| 15 | 1.0575 | 14.08 |
| 20 | 1.0761 | 18.39 |
| 25 | 1.0946 | 22.52 |

The scale is divided into fifths of degrees, and tenths may be properly estimated.

To avoid the necessity of making the stem of the instrument of inconvenient length, or the scale with too short graduations, I prefer to employ two separate instruments for testing the mash before and after fermentation, the scale of one instrument being a continuation of the other.

The thermometer may have marks and figures at the side showing the percentage of spirit to be subtracted from that given by the areometer should the temperature of the mash tested be above, or added if below, 62° Fahrenheit, this being the normal or standard temperature to which measurements of all kinds are usually referred.

Operation.

The test is first made with the unfermented mash, a small quantity of the liquid being introduced into the can for this purpose in the manner already explained.

The fermentation having proceeded until a cessation of the progressive reduction in density indicates that it is as complete as possible, a new test is made.

If now the density of the fermented beer be reduced to that of water, indicated by zero on the scale, the indication of the first test is taken as giving the percentage of proof-spirit which is to be expected. If the fermentation does not proceed so far, then the indications of the instrument in the fermented mash or beer must be deducted from the first indication. If, on the contrary, the beer should prove lighter than water, as may be the case in rare instances, the last indication must be added. For example, if forty-five gallons of water have been used to each bushel of grain and the process of saccharification has been well conducted, the instrument will show nine per cent., signifying that if the fermentation takes place thoroughly, so that the indication in the beer is 0°, we may look for nine per cent. of its volume to be proof-spirit; or since there will be fifty gallons of beer for each bushel of grain, the yield will be eighteen quarts. But if, after fermentation, the indication is 1°, the yield will be only eight per cent. of the beer, or sixteen quarts per bushel. If, on the contrary, the instrument shows 5°, the yield will be 9.5 per cent., or nineteen quarts.

Of all the various instruments devised for testing liquors I am not aware that any has before been constructed with a scale which would indicate directly the probable yield, by testing the unfermented grain-mash, without the use of a table or a complex calculation. For the reasons given, this instrument excels in correctness and simplicity all others of which I have any knowledge.

My claim includes making the scale of any degree of linear measures, open or close, and in any convenient number of serial stems. It also includes making a scale for the test of molasses solutions, which gives indications between one-eighteenth and one-twentieth part greater than for a grain-mash of the same density.

Claims.

I claim as my invention—

1. The areometer, constructed and graduated substantially as herein described, so as to indicate directly the percentage of proof-spirits to be expected from a grain-mash or other saccharine solution, without the necessity of complex calculation or the use of a table.

2. The funnel A, constructed with a valve to be closed by hand in substantially the manner described.

3. The combination of the plug or valve B and packing C with the funnel A, substantially as set forth.

Witnesses:     GIUSEPPE TAGLIABUE.
  H. C. ELLIOTT,
  WM. H. BRERETON, Jr.